United States Patent [19]
Araki et al.

[11] Patent Number: 5,859,659
[45] Date of Patent: *Jan. 12, 1999

[54] LASER BEAM SCANNING DEVICE AND METHOD INCLUDING LIGHT INTENSITY ADJUSTMENT

[75] Inventors: Yoshiyuki Araki; Naoyuki Okamoto, both of Tokyo, Japan

[73] Assignee: Asahi Kogaku Kogyo Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 680,649

[22] Filed: Jul. 16, 1996

[30] Foreign Application Priority Data

Jul. 19, 1995 [JP] Japan .................................. 7-205207

[51] Int. Cl.$^6$ ...................................................... B41J 2/47
[52] U.S. Cl. .......................................... 347/246; 347/253
[58] Field of Search ............................ 250/205; 347/253, 347/246, 326, 251, 240, 131, 236

[56] References Cited

U.S. PATENT DOCUMENTS

| | | | |
|---|---|---|---|
| 4,695,714 | 9/1987 | Kimizuba et al. | 250/205 |
| 4,757,191 | 7/1988 | Shimada et al. | 250/205 |
| 4,806,946 | 2/1989 | Ohnishi . | |
| 4,849,980 | 7/1989 | Shoji et al. . | |
| 4,907,236 | 3/1990 | Shimada | 372/31 |
| 5,055,663 | 10/1991 | Morimoto et al. . | |
| 5,159,184 | 10/1992 | Egawa et al. | 250/205 |
| 5,353,048 | 10/1994 | Kanai | 347/246 |
| 5,497,184 | 3/1996 | Saito et al. . | |

*Primary Examiner*—Mark J. Reinhart
*Attorney, Agent, or Firm*—Greenblum & Bernstein P.L.C.

[57] ABSTRACT

A laser scanning device emits a scanning laser beam which scans a predetermined surface to be scanned to form an image consisting of a plurality of pixels on the surface. The laser scanning device determines the intensity of the laser beam for each pixel of an image to be formed, and executes a feed-back control of the laser diode so that the intensity of the laser beam for each pixel accurately corresponds to the gradation level thereof.

22 Claims, 2 Drawing Sheets

LASER BEAM SCANNING DEVICE AND METHOD INCLUDING LIGHT INTENSITY ADJUSTMENT

BACKGROUND OF THE INVENTION

The present invention relates to a laser scanning device for emitting an amplitude-modulated scanning laser beam, and to a method of modulating the laser beam employed in such a laser scanning device.

Conventionally, a laser scanning device utilizing a laser diode which is controlled to emit an amplitude-modulated laser beam is known. Such a laser scanning device is used, for example, to form a latent image on a photoconductive material of an imaging device such as a laser beam printer. Recently, printers capable of printing not only a black and white image but also an image having gradation are desired by users.

Generally, in order to form the image having gradation, the intensity of the laser beam is varied in accordance with the gradation level of the image data. If the laser scanning device as described above is used, in an imaging device forming the gradation image, in order to make the intensity of the emitted laser beam for each gradation step stable, an APC (automatic power controlling) is performed. When the APC is performed, a white level intensity and/or a black level intensity of the emitted laser beam are adjusted during a period where the scanning beam does not affect the imaging process, more specifically, the laser beam emitted by the laser diode is received by a photo diode. Across the photo diode, electrical current corresponding to the received amount of light (i.e., laser beam) is generated. Based on the current generated by the photo diode, the intensity of the beam emitted by the laser diode is determined and then the laser diode is feed-back controlled so that the black level intensity and white level intensity of the laser beam have predetermined, or specified values, respectively. When the intensity of each of the black and white level is determined, the current to flow through the laser diode to obtain the white level and black level laser beam can be determined. After the current values to emit the black and white levels of the laser beams are determined, the difference between the black and white levels is divided in accordance with the number of gradation steps, and the laser diode is controlled to emit the laser beam in accordance with the image data having the gradation information.

The photo diode has, however its intrinsic errors in terms of its sensitivity. That is, even if the same amount of light is incident to the photo diode, generated current with respect to received amount of light may depend on respective photo diodes. Further, depending on the ambient temperature, the characteristics of the laser diode varies. Therefore, as the laser scanning device (i.e., the laser diode) is used, the temperature may increase and the characteristics may change. If the intensity of the laser beam is not proportional to the current flowing through the laser diode, the gradation level may not be accurate even though the intensities of the black and white level are adjusted during the APC operation.

SUMMARY OF THE INVENTION

It is therefore an object of the invention to provide an improved laser scanning device with which the intensity of the laser beam can be accurately controlled so that the gradation image can be formed easily.

For this purpose, according to an aspect of the invention, there is provided a laser scanning device for emitting a scanning laser beam which scans a predetermined surface to be scanned to form an image consisting of a plurality of pixels on the surface, including:
a mechanism for determining an intensity of a laser beam for each pixel in accordance with an image data,
a mechanism for detecting the intensity of the laser beam for each pixel; and
a mechanism for adjusting the intensity of the laser beam for each pixel such that the intensity of the laser beam coincides with the intensity determined by the determining mechanism.

According to another aspect of the invention, there is provided a laser scanning device for emitting scanning laser beam which scans a predetermined surface to be scanned to form an image consisting of a plurality of pixels, includes:
a laser diode for emitting laser beam;
a photo diode for receiving a part of a laser beam emitted by the laser diode and generates electrical current corresponding to the intensity of the received beam;
a modulation circuit for determining the intensity of the laser beam emitted by the laser diode for each pixel of the image in accordance with an image data;
a feed-back controller for controlling the laser diode to emit the laser beam having the intensity determined by the modulation circuit.

Since the intensity of the laser beam is adjusted for each pixel with use of a feed-back control, the image can be formed accurately.

Further, when the image data has gradation information for each pixel, the intensity of the laser beam for each pixel can be adjusted correctly, and therefore, resolution in terms of the gradation steps can be made higher.

Optionally, the laser scanning device may have a beam splitter for splitting the laser beam emitted by the laser diode to a first beam to be used for scanning the surface to be scanned, and a second beam directed towards the photo diode. In this case, since only the amount of light is to be split, the splitter may be a half mirror or the like.

Further optionally, the surface to be scanned comprises a photoconductive surface, a latent image being formed as the photoconductive surface is scanned by the scanning laser beam.

Furthermore, the feed-back controller may have a current-voltage converting circuit for receiving electrical current and output a voltage value corresponding to the received electrical current, and the feed-back controller controls the intensity of the laser diode in accordance with a result of comparison of the voltage value output by the current-voltage converting circuit with a reference voltage value. In this case, the feed-back controller controls the laser diode so that the voltage value output by the current-voltage converting circuit becomes equal to the reference voltage value.

Optionally, the laser scanning device may have a light amount regulating member arranged between the laser diode and the photo diode, the light amount regulating member regulating the intensity of the laser beam directed from the laser diode to the photo diode. The light amount regulating member may have an aperture adjusting member having an aperture size which is changeable. By caging the aperture size, the amount of light incident to the photo diode can be adjusted so that the errors intrinsic to the photo diode can be cancelled.

According to a further aspect of the invention, there is provided a method of modulating a laser beam employed in a laser scanning device for emitting a scanning laser beam to form an image on a surface to be scanned. The method includes the steps of:
modulating the laser beam in accordance with an image data;

detecting the intensity of the laser beam which is modulated in accordance with the image data; and adjusting the intensity of the laser beam based on the detected intensity of the laser beam.

DESCRIPTION OF THE ACCOMPANYING DRAWINGS

DESCRIPTION OF THE EMBODIMENTS

Figure 1:
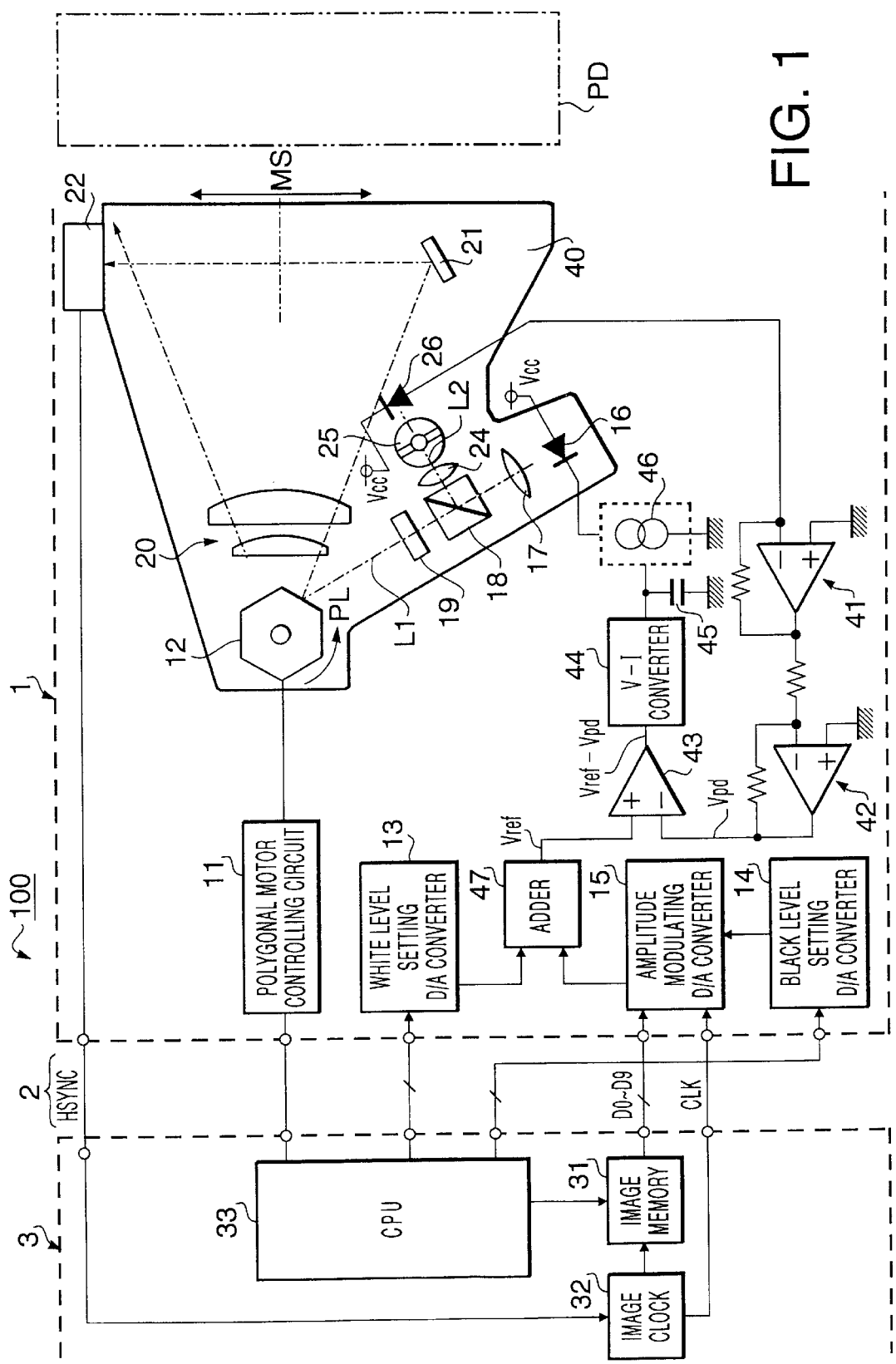
FIG. 1 is a block diagram of a laser scanning devices which is an embodiment according to the present invention, of a laser beam printer.

FIG. 1 is a block diagram of a laser scanning device 1, which is an embodiment according to the present invention, employed in a laser beam printer 100. The laser beam printer 100 has a printer controller unit 3 and the laser scanning device 1, which are connected with each other by means of a cable 2.

The printer controller unit 3 stores, in an image memory 31, a bit map of an image to be printed. The bit map stored in the image memory 31 is read out line by line synchronously with a horizontal synchronous signal HSYNC, and transferred to the laser scanning device 1 synchronously with a transfer clock CLK which is output by an image clock 32.

In the laser beam printer 100, an image having 1024 steps of gradation can be formed. Each line data of the image consists of a plurality of pixel data, and the pixel data is ten-bit digital data having 1024 steps of gradation information. Thus, for each dot, the ten-bit digital data D0–D9 is transferred from the image memory 31 to the laser scanning device 1.

A CPU (Central Processing Unit) 33 controls a polygonal mirror controlling circuit 11 to rotate a polygonal mirror 12 in the direction of arrow PL. The CPU 33 controls transfer of data from the image memory 31 to the laser scanning device 1. The CPU 33 further transmits data for setting white and black levels to a white level setting D/A (digital to analog) converter 13 and a black level setting D/A converter 14, respectively. The D/A converters 13 and 14 will be described later in detail.

The laser beam emitted from the laser diode 16 is converted into a parallel beam by the collimator lens 17, and then split into a power detection beam L2 to be used for adjusting an amount of the emitted beam, and a scanning beam L1 to be used for scanning.

The scanning beam L1 is refracted only in an auxiliary scanning direction by a cylindrical lens 19 and then directed to the polygonal mirror 12 (definition of auxiliary scanning will be given later). The beam reflected on the reflection surface of the polygonal mirror 12 is directed to a surface to be scanned (e.g., a photoconductive surface of a photoconductive drum PD) through an fθ lens 20. Thus the photoconductive surface of the photoconductive drum PD is exposed to the scanning beam L1 which scans in the direction indicated by arrow MS. The direction indicated by arrow MS will be referred to as a main scanning direction hereinafter.

The photoconductive drum PD has its rotational axis extending in the main scanning direction. While exposed to the scanning beam L1, the photoconductive drum PD rotates about the rotational axis at a predetermined speed, Thus, the laser beam L1 scans the photoconductive surface of the photoconductive drum in the main scanning direction, and the photoconductive surface of the photoconductive drum PD moves in the direction perpendicular to the main scanning direction, thereby two dimensional latent image is formed on the photoconductive surface of the photoconductive drum PD. The direction of the movement of the photoconductive surface along the line at which the laser beam from the lens system 20 is incident will be referred to as an auxiliary scanning direction hereafter.

To the latent image formed on the photoconductive surface of the photoconductive drum PD, toner is applied (i.e., the image is developed) and a toner image is formed thereon. The toner image is transferred onto a recording sheet. Then, to the toner image transferred on the recording sheet, heat and/or pressure is applied so that the image is fixed on the recording sheet.

The laser scanning device 1 has a beam position detecting circuit 22, and a mirror 21 for reflecting scanning laser beam L1 to be incident to the beam position detecting circuit 22. The mirror 21 is provided at a position where the mirror 21 does not affect image forming by the laser beam L1. In other words, the mirror 21 is located out of the area where the scanning laser beams L1 exposes the photoconductive surface of the photoconductive drum PD.

The laser beam L1 reflected by the mirror 21 is incident to the light receiving surface of the beam position detecting circuit 22. The beam position detecting circuit 22 outputs a pulse every time the beam position detecting circuit 22 receives the laser beam L1, which is reflected by the mirror 21. Therefore, at each scanning of the laser beam L1, the beam position detecting circuit 22 outputs one pulse. The pulse signal output by the beam position detecting circuit 22 is transmitted to the print controller 3 and used as a horizontal synchronous signal HSYNC which was mentioned before.

The power detection beam L2 split by a beam splitter 18 is incident to the light receiving portion of a photo diode 26, through a converging lens 24. Between the converging lens 24 and the photo diode 26, an aperture adjusting member 25 is arranged. By adjusting the size of the aperture through which the detection beam L2 passes through with use of the aperture adjusting member 25, differences and/or errors of the sensitivity and position of the photo diode 26 are compensated. The aperture adjusting member 25 will be described in detail later. Note that in this embodiment, the converging lens 24 is employed, and the detection laser beam L2 is converged and then the amount of light is adjusted by the aperture adjusting member 25. However, the converging lens 24 may be omitted and the laser beam L2 split by the beam splitter 18 may be directly directed to the aperture adjusting member 25.

When the photo diode 26 receives the detection laser beam L2, electrical current proportional to the intensity of received light is generated. The electrical current is then converted into a voltage value by means of I-V converter 41, and amplified at a predetermined gain by an inverting amplifier 42 to obtain power control voltage Vpd which is used for controlling the intensity of the laser beam emitted by the laser diode 16.

The power control voltage Vpd is applied to a negative terminal of a differential amplifier 43. To a positive terminal of the differential amplifier 43, a reference voltage Vref which is used as a reference value when power control is applied. The reference voltage Vref is output from an adder 47. It should be noted that the reference voltage Vref varies in accordance with the bit map data, which will be described in detail later.

To the adder 47, outputs from the white level setting D/A converter 13 and the amplitude modulating D/A converter 15 are input. The white level setting D/A converter 13 outputs an offset voltage value Vwt which corresponds to the intensity of the laser beam emitted by the laser diode 16 to form a white portion of the image on the photoconductive drum PD. From the amplitude modulating D/A converter 15, a variable voltage value Vam which corresponds to the gradation step of each dot of the image data (bit map) is transmitted to the adder 47. The variable voltage value Vam is generated based on the image data (bit map) and a voltage value generated by a black level setting D/A converter 14. The black level setting D/A converter 14 outputs a black level voltage value Vbk which corresponds to the intensity of the laser beam emitted by the laser diode 16 to form a black portion of the image on the photoconductive drum PD.

The differential amplifier 43 outputs a voltage Vdif which is calculated as below:

$$Vdif = Vref - Vpd.$$

The voltage value Vdif (i.e., Vref−Vpd) is input into a V-I (voltage-current) converter 44 and converted into an electrical current to charge/discharge a hold condenser 45. Charging and discharging of the hold condenser 45 is performed such that:
if Vref−Vpd>0, then the hold condenser 45 is charged; and
if Vref−Vpd<0, the hold condenser 45 is discharged.

Voltage value across the hold condenser 45 is applied to a V-I converter 46. The V-I converter 46 makes electrical current corresponding to the applied voltage to flow through the laser diode 16. Then the laser diode 16 emits the laser beam corresponding to the current flows therethrough.

In the conventional laser scanning devices, APC is performed with use of a photo diode which is enclosed in the same casing as the laser diode is enclosed. In such devices, APC is performed during the laser beam scans out of an area where image is to be formed. In the laser scanning device 1 according to the present embodiment, amplitude modulation of the beam is feed-back controlled during image forming, and therefore the intensity of the laser beam is always monitored. For this purpose, the response of the photo diode is required to be relatively fast, and the characteristic of the photo diode with respect to received light and generated current are required to maintain linearity.

The conventional photo diode, i.e., the photo diode enclosed together with the laser diode may not have the linear characteristic since a plurality of laser beams exist due to diffuse reflection inside the casing, and the beams may interfere with each other. In this embodiment, it is necessary to perform the APC at a relatively high speed throughout the scanning operation. Therefore, in the embodiment, the photo diode 26 is located separately from the laser diode 16 and located outside the casing of the laser diode 16.

In order to direct the laser beam output by the laser diode 16 to the photo diode 26, the beam splitter 18 is used, as mentioned before. By the beam splitter 18, the laser beam emitted by the laser diode 16 is split into two beams: the scanning beam L1 directed to the polygonal mirror 12; and the detection beam directed to the photo diode 26. The beam splitter 18 splits the beam at a predetermined proportion. Note that the beam splitter 18 splits the beam for performing APC, and therefore the split is not based on the polarization components. The beam splitter 18 splits the intensity of the beams, as is done by a half mirror or the like.

The detection beam L2 split by the beam splitter 18 and directed towards the photo diode 26 is converged by the converging lens 24 onto the light receiving portion of the photo diode 26. As described before, the photo diode 26 has an intrinsic characteristic difference, i.e., difference of linearity to the characteristics and sensitivity errors. Due to the characteristic difference of the photo diode 26, and further depending on the reflectivity of the polygonal mirror 12, transparency of the fθ lens 20 due to its coating and the like, the intensity of laser beam converged on the photo diode 26 may not have the designed characteristics.

Conventionally, such errors have been cancelled by adjusting the gain of the inverting amplifier 42 by means of a variable resister and the like. However, in the embodiment, feed back is performed at relatively high speed. If the variable resister is employed in such circuits, the circuits may oscillate due to capacitance the variable resister may potentially have. In order to avoid such oscillation of the circuit, the gain of the inverting amplifier 42 is maintained, and instead, aperture adjusting member 25 is arranged between the photo diode 26 and the beam splitter 15 to adjust, or normalize the intensity of the laser beam incident to the light receiving portion of the photo diode 26. Note that the term normalize in this specification means to adjust the intensity of beam incident to the light receiving portion of the photo diode 26 so that the intensity of beam on the light receiving surface of the photoconductive drum PD and the output voltage Vpd of the inverting amplifier 42 have a predetermined relationship.

Figure 2:
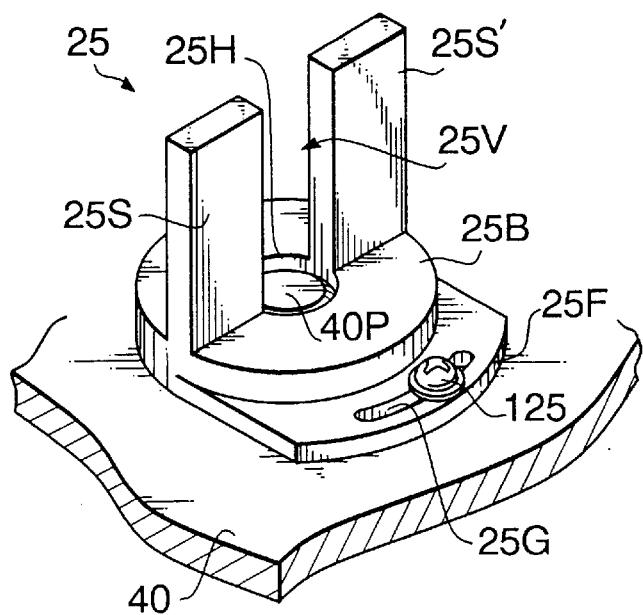
FIG. 2 is a schematic perspective view of an adjustable aperture member.

FIG. 2 is a perspective view of the aperture adjusting member 25 which functions to normalize the intensity of the laser beam incident to the light receiving portion of the photo diode 26. The aperture adjusting member 25 has a seating 25B having an opening 25H. The opening 25H is rotatably fitted on a projected circular member 40P formed on a bottom surface of a unit frame 40. On the seating 25B, a flange portion 25F is formed. The flange portion 25F contacts the bottom surface of the frame 40. On the seating 25B, a pair of light shield members 25S and 25S' are uprightly provided. The optical axis of the detection beam L2 directed from the beam splitter 18 to the photo diode 26 passes through the clearance 25V between the pair of light shield members 25S, 25S'. On the flange portion 25F, an arc shaped long hole 25G is formed, the center of the arc of the arc shaped hole 25G is the center of the rotary movement of the aperture adjusting member 25, which is the center of the opening 25H. A screw 125 is inserted through the long hole 25G and fastened to fix the seating 25B on the frame 40.

In order to adjust the amount of light passing through the clearance 25V, the screw 125 is first loosened, the adjusting member 25 is rotated with the arc-shaped long hole 25G being engaged with the screw 125. After the adjustment is completed, the screw is fastened and the flange 25F is secured onto the frame 40.

The intensity of the laser beam at the photo diode 26 is adjusted by rotating the aperture adjusting members 25 about the projected circular member 40P. When the adjusting member 25 is rotated, the amount of light which passes through the clearance 25V can be changed. If the position of the aperture adjusting member 25 is properly determined, it is possible to make the output voltage Vpd of the inverting amplifier 42 and the intensity of the laser beam received on the surface of the photoconductive drum PD have a predetermined relationship.

When the laser diode 16 emits the laser beam, charging and discharging of the hold condenser 45 depends on the voltage difference between Vref−Vpd. The circuit becomes stable when the voltage Vpd coincides with the reference voltage Vref, i.e., the voltage Vpd output by the inverting amplifier 42 becomes equal to the reference voltage Vref. If the reference voltage Vref is varied, the voltage Vpd corresponding to the stable condition of the circuit changes accordingly. Thus, in accordance with the reference voltage Vref, the intensity of the laser beam emitted by the laser diode 16 is automatically controlled.

In the circuit having the above-described structure, if the reference voltage Vref is changed, the intensity of the laser beam emitted by the laser diode 16 changes accordingly. Therefore, by changing the reference voltage Vref to be applied to the differential amplifier 43 according to the image data, amplitude modulation of the laser beam according to the image data (i.e., bit map stored in the image memory 31) can be achieved.

Figure 3:
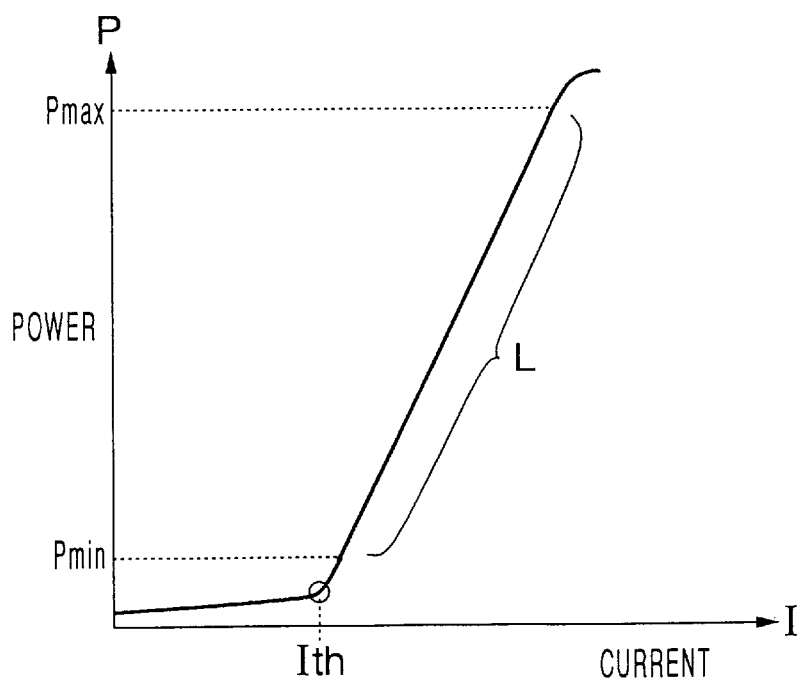
FIGS. 3 is a graph indicating current-intensity characteristics of a laser diode used in the laser beam printer shown in FIG. 1.

FIG. 3 shows a current-output characteristic of the laser diode 16. Generally, the laser diode 16 has a threshold current Ith, When the current flowing across the laser diode 16 is lower than the threshold current Ith, the performance of the laser diode 16 is unstable, while when the current available in the laser diode 16 is equal to or greater than the threshold current Ith, the laser diode 16 stably emits the laser beam.

In order to control the amplitude of the laser beam based on data having gradation information, the current to flow across the laser diode 16 should be greater than the threshold current Ith, and within the range where the laser diode 16 stably oscillates (within a range L in FIG. 3). Note that, in the embodiment, the laser diode is continuously feed-back controlled. Therefore, even if the current-power characteristics of the laser diode 16 is not linear, accurate gradation output can be obtained.

In FIG. 1, if Vref is 0, the voltage across the hold condenser 45 becomes 0, the current across the laser diode 16 is 0, and therefore the intensity of the laser beam becomes 0 (i.e., the laser beam is not emitted from the laser diode 16).

Under this condition, when a laser beam having a certain intensity is to be emitted, the reference voltage Vref should be determined such that the current which flows through the laser diode 16 exceeds at least the threshold current Ith, regardless of the intensity of the laser beam to be emitted. Further, in order to output the laser beam corresponding to the gradation of an image to be formed, the current which flows through the laser diode 16 should be controlled to be within the range L (shown in FIG. 3) where the laser diode 16 stably oscillates to emit the laser beam.

If the laser scanning device 1 is constructed such that the laser beam is not emitted (i.e., the intensity is 0) when the gradation step of the image data is 0, the problem described below arises. Once the laser beam is completely discharged in order to make the intensity of the emitted beam to be 0, if the laser beam is to be emitted to form an image having the gradation step greater than 1, the current flowing through the laser diode 16 should be increased to exceed the threshold current Ith in order that the laser diode 16 stably emits the laser beam, which requires time. If the gradation level changes among 1 through 1023, the intensity of the laser beam can be controlled quickly since the control is performed within the range L in FIG. 3. However, when the gradation level is changed from 0 to another value, the current flowing through the laser diode 16 exceeds the threshold current Ith, and therefore changing the intensity of the laser beam requires time which prevents quick image forming operation.

In the laser scanning device 1 according to the embodiment, in order to avoid the above problem, when the printing data indicates a white dot (pixel), the intensity of the laser beam is not to be 0, but to have a weak power Pmin with which the photoconductive drum PD may not be sensitized. In other words, the voltage across the hold condenser 45 is at least a value such that the laser beam emitted by the laser diode 16 has power Pmin. Therefore, when the print data D0–D9 are all 0, the reference voltage Vref equals to the voltage output by the white level setting D/A converter 13, and the power of the laser beam emitted by the laser diode 16 is Pmin.

In the embodiment, the white level setting D/A converter 13 receives digital data from the CPU 33, converts the received digital data into an analog voltage value Vwt, and outputs the voltage value Vwt. Depending on the received digital data, the output voltage Vwt of the white level setting D/A converter 13 varies. Since the voltage value Vwt corresponds to the power Pmin of the laser beam, the output voltage of the white level setting D/A converter 13 determines the offset value of the intensity of the laser beam emitted by the laser diode 16. In other words, the darkness of the image to be formed on a recording sheet can be changed by changing the voltage value Vwt. If the laser scanning device 1 is used for color printing, each color component can be set to have a desired density by varying the voltage value Vwt.

Although, in the embodiment, the D/A converter is used for varying the voltage, other devices such as a variable resister can also be used for varying the voltage value. Furthermore, if the voltage Vwt corresponding to the white level of the laser beam is already known, and the voltage Vwt needs not to be changed, the voltage value Vwt of the white level setting D/A converter 13 may be a fixed value.

There is provided another D/A converter 14 for setting a black level of the laser beam. The D/A converter 14 receives the digital data from the CPU 33 and outputs the voltage value Vbk. The black level voltage Vbk can be changed independently of the white level, i.e., the voltage value Vwt. If the voltage value Vwt is changed, the entire thickness of the image to be formed is changed since the voltage value Vwt is the offset value as described above. If the voltage Vbk is appropriately determined in accordance with the change of the voltage value Vwt, the intensity of the laser beam when the black image is formed may not be affected by the change of the white level voltage value Vwt. In this case, as the voltage value Vwt varies and the voltage value Vbk does not change, the difference between the voltage values Vwt and Vbk changes, and therefore the difference between the minimum power Pmin and the maximum power changes. When the laser beam is emitted to form the image, the difference between the minimum and maximum powers Pmin and Pmax is divided in accordance with the gradation steps.

An amplitude modulating D/A converter 15 is a multiplication type D/A converter. That is, the D/A converter 15 receives 10-bit data (D0–D9) representing 1024 steps of gradation and the voltage Vbk which is output from the D/A converter 14. Then the D/A converter 15 multiplies the output of the D/A converter 14 with printing data D0–D9, then outputs the resultant calculated voltage value Vam. Therefore, if all bits of the printing data D0–D9 are 1, the amplitude modulating D/A converter 15 outputs its maximum value. Then the reference voltage Vref output by the adder 47 has its maximum value which corresponds to the maximum power Pmax of the laser beam emitted by the laser diode 16 (see FIG. 3).

Operation of the laser scanning device when data D0–D9 are input will be described in detail.

The data D0–D9 is input in the amplitude modulating D/A converter 15. The voltage output by the amplitude modulating D/A converter 15 is calculated as follows:

$$Voltage = n/1023 \times (Vbk - Vwt)$$

wherein, n is a decimal number representing the gradation level corresponding to the 10-bit digital data D0–D9 ($0 \leq n \leq 1023$), Vbk−Vwt is the voltage output by the black level setting D/A converter 14, and Vwt is the voltage output by the white level setting D/A converter 13. Note that the output voltage of the D/A converter 14 is applied to the adder 47 through the amplitude modulating D/A converter 15. To the adder 47, the output voltage of the white level setting D/A converter 13 is also applied. When the data D0–D9 carries the maximum gradation level, the output of the adder 47 should become Vbk. Therefore, as expressed in the above formula, the black level setting D/A converter outputs the voltage value of Vbk−Vwt.

The output voltage of the adder 47 is expressed as follows:

$$Vref = Vwt + \{n/1023 \times (Vbk - Vwt)\}$$

According to this formula, if the gradation level n is equal to 0, Vref=Vwt, and if the gradation level n is equal to 1023, Vref=Vbk. Thus, when Vref=Vwt, the intensity of the laser beam emitted by the laser diode 16 is adjusted to the white level, and when Vref=Vbk, the intensity of the laser beam emitted by the laser diode 16 is adjusted to the white level. Further, depending on the value of n (which is indicated by the data D0–D9), Vref is adjusted to correspond to the gradation level of the image data. Once the Vref is determined, the intensity of the laser beam emitted by the laser diode 16 can be automatically adjusted to correspond to the reference voltage Vref. Since the laser diode 16 is feed-back controlled, and the relationship between the intensity of the beam on the photoconductive drum PD and the power control voltage Vpd is adjusted by means of the aperture adjusting member 25, the intensity of the laser beam emitted by the laser diode 16 can be accurately controlled.

For each dot to be printed, the above-described procedure is applied. That is, the laser diode is feed-back controlled for each dot, the amplitude modulation of the laser beam can be performed. In other words, intensity of the emitted beam can be determined accurately corresponding to the gradation level of the image data. Further, even if the intensity of the emitted laser beam is not proportional with respect to the electrical current available in the laser diode, the intensity of the laser beam can be adjusted accurately, since the APC is performed for each dot of the image.

The present disclosure relates to subject matter contained in Japanese Patent Application No. HEI 7-205207, filed on Jul. 19, 1995, which is expressly incorporated herein by reference in its entirety.

What is claimed is:

1. A laser scanning device for emitting a scanning laser beam which scans a predetermined surface to form an image consisting of a plurality of pixels on said surface, said device comprising:

means for emitting a laser beam;

means for modulating an intensity of the laser beam for each pixel;

means for receiving a portion of the laser beam emitted by said emitting means, and generating an electrical current corresponding to an intensity of the received beam; and means, positioned between said emitting means and said receiving means, for regulating an intensity of said laser beam from said emitting means received by said receiving means, whereby an electrical current generated by said receiving means and an intensity of light emitted by said emitting means have a predetermined relationship.

2. The laser scanning device according to claim 1, said modulating means comprising:

means for determining an intensity of said laser beam for each pixel in accordance with image data;

means for detecting said intensity of said laser beam for each pixel; and means for adjusting said intensity of said laser beam for each pixel such that said intensity of said laser beam coincides with said intensity determined by said determining means.

3. The laser scanning device according to claim 2, said adjusting means adjusting said intensity of said laser beam while said laser beam scans a recording area on said predetermined surface.

4. The laser scanning device according to claim 2, wherein said adjusting means adjusts the intensity of said laser beam when said laser beam scans an area outside of a recording area of said predetermined surface.

5. A laser scanning device for emitting a scanning laser beam which scans a predetermined surface to form an image on said predetermined surface consisting of a plurality of pixels, said laser scanning device comprising:

a laser diode that emits a laser beam;

a photo diode that receives a part of the laser beam emitted by said laser diode and that generates electrical current corresponding to an intensity of the received laser beam;

a modulator which adjusts an intensity of the laser beam for each pixel; and a light regulating member positioned between said laser diode and said photo diode, said light regulating member regulating an intensity of said laser beam from said laser diode received by said photo diode, so that the electrical current generated by the photo diode and the intensity of the light emitted by the laser diode have a predetermined relationship.

6. The laser scanning device according to claim 5, said light regulating member comprising a variable size aperture, through which said laser beam, emitted by said laser diode and directed to said photo diode passes, said aperture member being adjustable to change a size of the aperture through which said laser beam passes.

7. The laser scanning device according to claim 5, said portion of the laser beam received by said photo diode not scanning said predetermined surface.

8. The laser scanning device according to claim 5, said light regulating member not affecting an intensity of a portion of said laser beam directed to said predetermined surface.

9. The laser scanning device according to claim 5, said modulator comprising a modulation circuit that determines an intensity of said laser beam emitted by said laser diode for each pixel of said image in accordance with image data; and a feedback controller that controls said laser diode to emit said laser beam having an intensity determined by said modulation circuit.

10. The laser scanning device according to claim 9, said feedback controller controlling the intensity of said laser beam when said laser beam scans an area outside of a recording area of said predetermined surface.

11. The laser scanning device according to claim 9, said feedback controller controlling the intensity of said laser beam when said laser beam scans a recording area on said predetermined surface.

12. The laser scanning device according to claim 5, wherein said image data has gradation information for each pixel.

13. The laser scanning device according to claim 12, further comprising a beam splatter for splitting said laser beam emitted by said laser diode to a first beam to be used for scanning said surface to be scanned, and a second beam directed towards said photo diode.

14. The laser scanning device according to claim 13, wherein said surface to be scanned comprises a photoconductive surface, a latent image being formed as said photoconductive surface is scanned by said scanning laser beam.

15. The laser scanning device according to claim 9, wherein said feed-back controller comprises a current-voltage converting circuit for receiving electrical current and outputting a voltage value corresponding to said received electrical current, and wherein said feed-back controller controls said intensity of said laser diode in accordance with a result of comparison of said voltage value output by said current-voltage converting circuit with a reference voltage value.

16. The laser scanning device according to claim 1, further comprising a beam splitter for splitting said laser beam emitted by said emitting means into a first beam for scanning said predetermined surface, and a second beam directed towards said receiving means.

17. A method for compensating for errors of a photo diode that emits a laser beam employed in a laser scanning device to form an image on a surface to be scanned, said method comprising:

providing a laser diode that emits a laser beam;

providing a photo diode that receives a portion of the laser beam emitted by said laser diode and generates electrical current corresponding to an intensity of the beam received; and modulating an intensity of the laser beam for each pixel; and positioning a light adjusting member between the laser diode and the photo diode, the adjusting member adjusting the intensity of light incident onto the photo diode so that an electrical current generated by the photo diode and the intensity of the light emitted by the laser diode have a predetermined relationship.

18. The method according to claim 17, modulating an intensity of the laser beam comprising:

determining an intensity of the laser beam for each pixel in accordance with image data;

detecting the intensity of the laser beam for each pixel; and adjusting the intensity of the laser beam for each pixel such that the intensity of the laser beam coincides with the intensity determined.

19. The method according to claim 17, wherein determining the intensity includes provision of a circuit that determines the intensity of the laser beam emitted by the laser diode for each pixel of the image in accordance with image data; and adjusting the intensity comprises controlling, in a feedback fashion, the laser diode to emit the laser beam having an intensity determined by the modulation circuit.

20. The method according to claim 19, wherein adjusting of the intensity of the laser beam is performed while the laser beam scans a recording area on a surface to be scanned.

21. The method according to claim 19, wherein adjusting of the intensity of the laser beam is performed while the laser beam scans a non-recording area on the surface to be scanned.

22. The laser scanning device according to claim 15, wherein said modulation circuit varies said reference voltage value in accordance with said image data, and wherein said feedback controller controls said laser diode so that said voltage value output by said current-voltage converting circuit becomes equal to said reference voltage value.

* * * * *

UNITED STATES PATENT AND TRADEMARK OFFICE
CERTIFICATE OF CORRECTION

PATENT NO. : 5,859,659
DATED : January 12, 1999
INVENTOR(S) : Y. ARAKI

It is certified that error appears in the above-identified patent and that said Letters Patent is hereby corrected as shown below:

At column 11, line 13 ( claim 13, line 2) of the printed patent, change "splatter" to ---splitter---.

Signed and Sealed this

Eighth Day of February, 2000

Attest:

Q. TODD DICKINSON

Attesting Officer

Commissioner of Patents and Trademarks